Figures 1, 2:
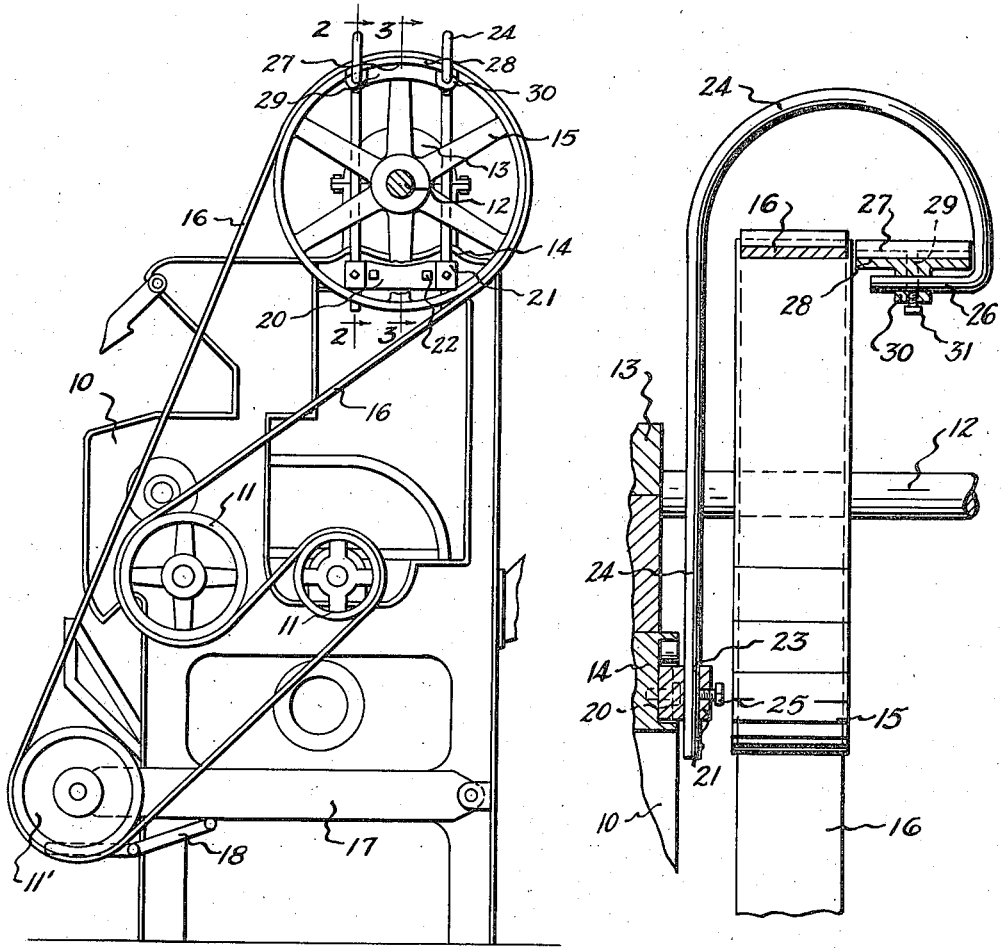

Dec. 27, 1938.  C. R. CARR  2,141,513

BELT HANGER

Filed Dec. 28, 1936

Inventor
CHARLES R. CARR
Jack A. Athley
Attorney

Patented Dec. 27, 1938

2,141,513

UNITED STATES PATENT OFFICE 2,141,513

BELT HANGER

Charles R. Carr, Atlanta, Ga., assignor to The Murray Company, Dallas, Tex., a corporation of Texas Application December 28, 1936, Serial No. 117,717

1 Claim. (Cl. 74—242.5)

This invention relates to new and useful improvements in belt hangers.

Heretofore, when it has been desired to disengage the belt of a belt driven mechanism from its pulley system for any reason where idler pulleys are not feasible, it has been the practice, particularly in installations wherein a battery of machines are driven from a common power shaft, to suspend the disengaged belt from the power shaft. It is obvious that such suspension is undesirable because of the wear on the belt at the point of suspension and the tendency of belts to crack or break when bent upon themselves so sharply, thereby requiring replacement of the belt. Also, a belt so hung from a rotating shaft has a tendency to creep or to be slowly moved by the shaft, thereby creating a hazard to workmen of becoming entangled in the moving belt. In addition, it is necessary to stop the power shaft to safely engage or disengage the belt from the drive pulley carried by the shaft.

It is, therefore, one object of this invention to provide an improved belt hanger which may be readily applied to a belt operated mechanism for supporting the belt thereof when the latter is disengaged.

An important object of the invention is to provide an improved belt hanger for supporting a belt while the latter is removed from its pulley, said hanger being so arranged that the time usually consumed in engaging or disengaging the belt from the pulley assembly of the machine is materially reduced.

Another object of the invention is to provide an improved belt hanger which is so arranged that it may be applied to either a single machine or each of a battery of machines driven from a common power shaft whereby the belt of any one or more machines may be readily and safely disengaged from its drive pulley and supported on said hanger without necessity of stopping the power shaft and all the machines.

A further object of the invention is to provide an improved hanger which is so arranged that when a belt is disengaged from its pulley system and resting on said hanger, said belt is maintained free of the machine, whereby such machine is made more accessible and may be more readily worked on.

Another object of the invention is to provide an improved belt hanger which is so constructed that it may be readily adjusted to various positions, whereby the same hanger may be used with pulleys of various diameters and widths.

Still another object of the invention is to provide an improved belt hanger which is so arranged that the support or rest for the belt has substantially the same curvature as the belt pulley and is positioned adjacent said pulley, whereby said rest extends substantially flush with the surface of the pulley and whereby the belt may be easily and safely engaged with or disengaged from said pulley without stopping the drive shaft and pulley.

A construction designed to carry out the invention will be hereinafter described, together with other features of the invention.

Figure 3:
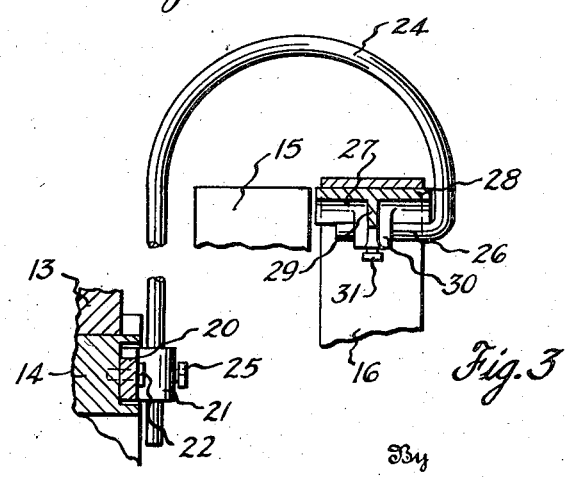

The invention will be more readily understood from a reading of the following specification and by reference to the accompanying drawing, in which an example of the invention is shown, and wherein:

Figure 1 is an end elevation of a cotton linter showing a belt hanger constructed in accordance with the invention mounted thereon, Figure 2 is an enlarged, transverse, vertical, sectional view taken on the line 2—2 of Figure 1, and Figure 3 is a similar view taken on the line 3—3 of Figure 1, showing the drive belt supported by the hanger.

In the drawing, the numeral 10 designates a cotton linter having the usual series of driven pulleys 11 at one end thereof. An elongate power shaft 12 is carried by a bearing 13 mounted on a support 14 at the top of the linter frame. This shaft is shown to be an elongate common power shaft from which a battery of machines may be driven, but may be an individual shaft for a single machine. A large drive pulley 15 is secured on the power shaft in vertical alinement with the series of driven pulleys 11, and an elongate continuous belt 16 is engaged over the drive pulley and said driven pulleys in the customary manner, whereby the pulleys 11 are driven by the drive pulley 15.

For adjusting the tension on the belt as well as for removing or replacing the belt on the pulley system, the lowermost driven pulley 11' is mounted on one end of an elongate swinging arm 17 which is pivoted at the other end to the rear side of the linter frame. A tension release lever 18 is pivotally secured at its central portion to the front edge of the linter frame and is so arranged that when the outer end of the lever is pressed downwardly, the inner end presses upwardly against the lower edge of the swinging arm 17 to raise the arm and pulley attached thereto, whereby the tension on the belt 16 is released. It will be obvious that when the tension on the belt is removed, said belt may be disengaged from the pulleys.

In installations in which the shaft 12 is very long and has a number of other machines connected to and driven by it, occasions sometimes arise requiring that one or more of these machines be disconnected from the shaft for repairs or for other reasons. It will be seen that to safely disconnect a machine from such a power shaft, the entire battery of machines driven by the shaft must ordinarily be stopped. Heretofore, after the belt has been disengaged from the drive pulley, it has been suspended from the power shaft. It is obvious, therefore, that after the shaft is again rotated the belt will either be worn at the point of contact with the shaft or will tend to creep or to be moved slowly by the shaft. Manifestly, this is a very unsatisfactory condition, both because of the wear on the belt requiring subsequent expensive replacement, and because of the inherent danger to workmen from the creeping of the belt, for should a workman in any manner become entangled with a moving or creeping belt, it is obvious that a great hazard of injury to the workman would arise. In addition the shaft must again be stopped to safely reengage the disconnected belt over the pulley system of the machine.

For overcoming these disadvantages and hazards, I have provided a simple belt hanger adapted to be mounted on the linter frame. A bracket or support 20 having outwardly projecting ears 21 thereon is secured by bolts 22, or other suitable means, to the linter frame below the bearing 13. The ears 21 on the bracket are provided with vertically extending openings 23, which receive elongate uprights or standards 24. The standards 24 are held in position in the ears 21 by set screws 25 which are screw threaded through the wall of each ear to engage said standards. The standards extend upwardly from the bracket 20 and the ears 21 are so positioned that the power shaft 12 extends between the standards.

Each standard is bent outwardly to overhang the drive pulley 15 and extends downwardly outside of said pulley. The shorter leg of the standard is then bent inwardly upon itself to form a supporting arm 26 for an arcuate belt rest 27. This belt rest includes a curved plate 28 which is reinforced by an integral longitudinal depending rib 29 having horizontally apertured lugs 30 thereon adapted to receive the supporting arms 26. The belt rest is held in position on the arms by set screws 31 which are screw threaded through the wall of each lug and engage the arm extending therethrough. It is noted that the curvature of the plate 28 is substantially the same as the arc of the pulley and said plate is so positioned that its inner edge lies contiguous to the outer edge of the drive pulley, whereby the plate is substantially flush with the surface of the pulley. It will be seen that due to such arrangement of the belt rest the belt may be readily and easily shifted from the pulley to the belt rest, while the drive pulley is being rotated.

Due to the length of the supporting arm 26, it will be seen that the belt rest may be moved laterally on said arm to accommodate pulleys of various widths. It will also be seen that the uprights or standards 24 may be adjusted to accommodate any desired diameter of pulley. Therefore, the belt hanger may be used with a machine wherein the width and diameter of the pulleys used varies.

In use the standards 24 and the belt rest 27 are so positioned that the upper surface of the belt rest is substantially flush with the surface of the drive pulley 15. Then, should an occasion arise requiring disconnecting the machine from the power shaft, it is only necessary to release the tension on the belt 16 by swinging the arm 17 upwardly by means of the lever 18, and to slide the belt outwardly off the drive pulley onto the belt rest 27. It is obvious that when the belt is supported by the belt rest, as shown in Figure 3, the lower portion of the belt may be removed from the driven pulleys 11, thereby leaving the end of the linter unobstructed and accessible to workmen.

Since the belt is suspended from the stationary rest 27 above the rotating power shaft 12, and free of the pulley 15, it will be seen that unnecessary wear on the belt is eliminated. Also, the danger of workmen accidentally becoming entangled in a creeping belt is removed, thereby obviating injuries resulting therefrom.

Further, it will be seen that the uprights or standards 24 serve as a retainer for the belt to prevent said belt from slipping off the machine side of the drive pulley onto the power shaft.

It is noted that while the standards have been shown as being bent in substantially a semi-circle to overhang the drive pulley any suitable curvature may be used. It is further understood that the machine upon which the hanger is mounted forms no part of the invention, and the invention is not limited to the linter shown.

What I claim and desire to secure by Letters Patent, is:

As a new article of manufacture, a bracket adapted to be secured to the upright end of a machine adjacent the driving pulley thereof, a belt support including upright spaced legs having their lower portions mounted for vertical adjustment in said bracket and their upper portions arched to form a guard over the machine pulley, the outer arched ends of the legs of the support being turned inwardly, and an arcuate belt rest mounted for horizontal adjustment on the inturned ends of said legs under the arches thereof for receiving and supporting an idle driving belt.

CHARLES R. CARR.